United States Patent [19]

Lees, Jr.

[11] Patent Number: 5,333,558
[45] Date of Patent: Aug. 2, 1994

[54] METHOD OF CAPTURING AND FIXING VOLATILE METAL AND METAL OXIDES IN AN INCINERATION PROCESS

[75] Inventor: John N. Lees, Jr., Brookfield, Wis.

[73] Assignee: Svedala Industries, Inc., Waukesha, Wis.

[21] Appl. No.: 986,331

[22] Filed: Dec. 7, 1992

[51] Int. Cl.$^5$ ............................................. F23G 5/00
[52] U.S. Cl. ................................... 110/346; 110/236; 110/246; 110/345; 110/229
[58] Field of Search ............... 110/236, 229, 346, 342, 110/345, 246

[56] References Cited

U.S. PATENT DOCUMENTS

| | | | |
|---|---|---|---|
| 4,546,711 | 10/1985 | Kerwin | 110/342 X |
| 5,005,493 | 4/1991 | Gitman | 110/246 |
| 5,152,233 | 10/1992 | Spisak | 110/246 X |
| 5,176,445 | 1/1993 | Mize | 110/236 X |
| 5,255,614 | 10/1993 | Wintrich et al. | 110/246 X |

Primary Examiner—Edward G. Favors
Attorney, Agent, or Firm—Robert B. Benson

[57] ABSTRACT

A thermal treatment system for converting contaminants in soil to non-hazardous compounds. The system includes a combustion chamber in which the soils to be treated are heated to a temperature above the volatilization temperature of the contaminants in the soil. Reagents are injected into the gas stream above the soil which contains the volatized contaminants to interact with the inorganic contaminants to form solid particles that can be collected on a filter for safe disposal. The volatized organic contaminants are burned to form non-toxic combustion gases.

8 Claims, 1 Drawing Sheet

METHOD OF CAPTURING AND FIXING VOLATILE METAL AND METAL OXIDES IN AN INCINERATION PROCESS

BACKGROUND OF THE INVENTION

Currently there are many areas of land in the world that have soils contaminated by hazardous materials such as organic compounds and inorganic metal compounds. Examples of organic contaminants are various hydrocarbon ring compounds such as benzene, toluene, ethylbenzene, and zylene compounds (commonly known as BTEX) polynuclear aromatic hydrocarbons (known as PAH); and chlorinated hydrocarbons. Examples of inorganic metal compounds are arsenic, lead, cadmium, and zinc, and their various oxides. It has been recognized that it is highly desirable that these hazardous materials do not end up in the atmosphere we breathe or the water we drink, therefore the goal of environmental remediation activities has been to destroy or remove the organic contaminants, and to stabilize or prevent the migration of the inorganic metals and their compounds into the groundwater.

DESCRIPTION OF PRIOR ART

Presently these contaminants are removed from the soil by various thermal treatment processes. Thermal processes convert organic contaminants in the soil to non-hazardous compounds by the use of heat. The thermal process normally uses the combustion of fuels to heat the soil, but is not limited to combustion processes. A device commonly used is a combustion chamber such as a rotary kiln. As the soil is heated in the rotary kiln, the organic contaminants are volatized and move into the gas stream of the products of combustion above the tumbling bed of soil in the kiln. The gases which contain the organic compounds may then be treated in a secondary combustion chamber (thermal oxidizer) or they may be cooled to a very low temperature to condense the organic compounds so they may be collected on activated carbon to remove them from the gas stream.

Soils containing inorganic contaminants including metals and their oxides are treated using non-thermal methods so as to stabilize them or prevent their migration through the soil using ash stabilization methods. Contemporary ash stabiliztion methods include the addition of lime, pozzolans (flyash, blast furnace slag, cement kiln dust, etc.) cement and/or soluble silicates to produce a treated ash in which the contaminant is micro-encapsulated and therefore will not readily leach into the surrounding environment. These methods are routinely used to stabilize kiln ash and air pollution control residues.

For example, in the treatment of arsenic-containing waste soils, iron reagents and lime are often used to fix arsenic in the form of a basic ferric arsenate. The stability of ferric arsenate in landfills subject to water and air is considered to be 100 to 1,000 times greater when the Fe/As molar ratio is 4 (i.e., at a mass ratio of 3) or greater, in a pH range of 3 to 7, as compared to simple ferric arsenate or scorodite ($FeAsO_4 \cdot 2 H_2O$). The stability of the ferric arsenate may also be affected by the conditions under which the compound is precipitated. This approach to arsenic stabilization is well known and has been used for many years in the mining and minerals processing industry.

PROBLEMS WITH THE PRIOR ART

When soils containing both organic and inorganic contaminants are treated using thermal methods, some level of volatilization of the inorganic contaminants occurs in the kiln. This volatilization is undesirable because these metals cannot be converted to non-hazardous materials merely by oxidation, and they are extremely difficult to remove from the gas stream. The gases leaving the kiln are cooled with air or water to reduce their temperature to approximately 180° F. or below, thereby condensing the metals from their vapor state to their solid state so they may be collected in a wet precipitator or a wet scrubber. However, the use of these devices leads to metals contamination in the water and another pollution control problem. The use of these devices also results in corrosion and maintenance problems and a requirement for very expensive materials of construction.

SUMMARY OF INVENTION

This invention contemplates solving the problems of prior thermal treatment processes by injecting reagents into the gas stream above the bed of contaminated soil to react with the volatized inorganic contaminants to form non-volatile solid particles that can be collected in a filter for safe disposal.

DESCRIPTION OF THE PREFERRED EMBODIMENT

Figure 1:
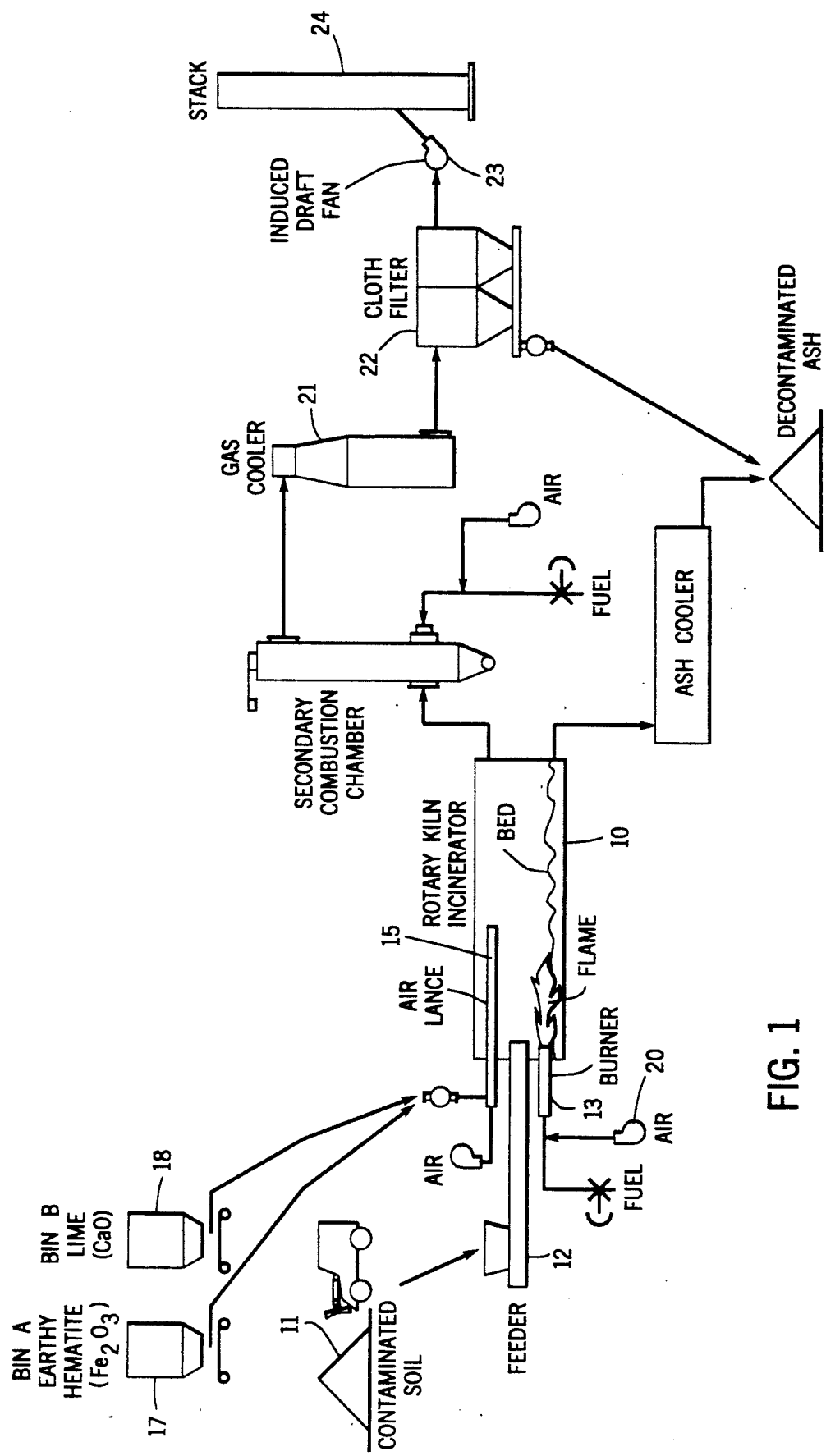
FIG. 1 is a schematic of a thermal treatment system incorporating this invention.

The illustrated thermal treatment process includes an incinerator, shown as a rotary kiln 10, as the primary heating and combustion chamber. Contaminated soil 11, is moved into the kiln 10, by a feeder 12. The soil is heated by a convective and radiative interaction with the hot products of combustion in a flame formed by burning fuel, such as natural gas, and air, in burner 13. As the kiln rotates, the soil forms a tumbling bed 14 which is moved toward the discharge end due to the slight downward inclination of the kiln. The soil is heated to the necessary organic contaminant volatilization temperature range, the organic contaminants volatize, and some of the inorganic contaminants also volatize.

The appropriate soil treatment temperature is chosen so as to ensure that all organic contaminants are volatized. The more complex organic forms typically volatize at higher temperatures than the more simple compounds. If the soil is contaminated with many organic compounds, then those with the highest volatilization temperature or boiling points must be considered when choosing the temperature to which the soil must be heated. Some of these organic contaminants resist volatizing, so it may be necessary to exceed the boiling point by a significant margin to ensure these organic contaminants are completely removed.

At the entrance to the kiln, there is positioned an air lance 15 which is used to bring needed air into the system. The air lance is a tubular duct which extends into the kiln for some distance. Finely divided solid particulate reagent materials, 16 are moved from bins 17, and 18, into an entrainment region in the air lance, where the particles become entrained in the air flow, and are moved by pneumatic transport into the kiln combustion gas stream where they remain entrained and move with the combustion gas stream through the kiln. The air lance 15 receives air from a fan 20 which moves the air through an entrainment region and into the air lance.

While many reagent chemicals could be chosen in many forms, the schematic illustrates the use of earthy hematite (highly weathered, high surface area iron oxide - $Fe_2O_3$) and lime (calcium oxide - $CaO$). These reagent materials are particularly good choices because they have a particular affinity for, and readily react with, arsenic, and they contribute to formation of the very non-leachable basic ferric arsenate.

The reagent materials interact chemically with volatized inorganics in the kiln to form solid, non-volatile particulates. The reagent materials are sized so as to be at the proper fine particle size so as to permit them to remain entrained, and they are added at the proper mass ratios so as to be present substantially in excess of the stoichiometric, or "chemically correct" masses required to react with all the volatile inorganic contaminants which may become volatized.

Hot gas, containing the volatized organic contaminants, and the solid non-volatile particulates leave the kiln for further processing, possibly in the secondary combustion chamber 20, and in the gas cooler 21 and filter 22, before passing to the atmosphere through the fan 23 and stack 24. The cooler 21 serves to cool the gas to a temperature level that can be safely handled by the filter, for example, a gas temperature of about 350° F.

The filter 22 captures the non-volatile particulates from the gas stream. In our system we show a standard baghouse filter which is especially effective in this type of application. The captured particulates are removed with the baghouse filter and disposed of in a safe manner.

In addition to moving the reagents into the gas stream inside the kiln, the reagents may also be intimately mixed with the contaminated soil before the soil is moved into the kiln. When in the kiln, some of the inorganic contaminants volatize, and diffuse through the void spaces in the soil and through the void spaces between the soil lumps in the tumbling soil bed, reacting with the reagents mixed with the soil to form solid, non-volatile compounds, such as iron arsenate and calcium arsenate. Since these compounds are not volatile, they remain in the soil, and are not moved into the gas stream. The mixture of solid, non-volatile compounds thus formed is also quite resistant to leaching the inorganic contaminants into the ground water, therefore, this method serves the overall goal of limiting environmental pollution.

After the soil has been treated in the kiln it is discharged into an ash cooler prior to being returned to its natural location.

Although this invention has been described in connection with treating contaminated soil, it could also be used with other materials containing similar contaminants.

The embodiments at the invention in which an exclusive property or privilege is claimed are defined as follows:

1. The process for removing hazardous material from a contaminated feed in an incineration system consisting of:
   a combustion chamber, a cooler, a filter, and a fan for causing gas to flow from said chamber through said cooler and then through said filter before being discharged to atmosphere. Said process comprising:
   feeding material containing both organic and inorganic contaminants into said chamber
   heating said material with a combustion gas to above the volatilization temperature of said contaminants to transform said contaminants into a gas which mixes with the combustion gas
   maintaining the temperature of the combustion gas in said chamber to above the burning temperature of said organic contaminants
   injecting finely powdered reagents into the combustion gas containing said volatized contaminants above the material in said chamber to interact with said volatized inorganic contaminants to form solid particles
   cooling said combustion gas
   capturing said particles in said filter for disposal
   discharging said purified gas to atmosphere.

2. The process of claim 1 in which the reagents contain at least some $Fe_2O_3$.

3. The process of claim 1 in which the reagents contains at least some $CaO$.

4. The process of claim 1 in which the material contains at least some arsenic.

5. The process of claim 1 in which the material contains at least some lead.

6. The process of claim 1 in which a second combustion chamber is inserted between said first chamber and said cooler and the additional step of adding heat to said second chamber to elevate the temperature of the gas in said second chamber to enhance the burning of organic contaminants remaining in the gas stream.

7. The process of claim 1 in which the material also contains reagents which react with some of said inorganic contaminants to form non-volatile non-leachable compounds within the bed of said material.

8. The process of claim 1 in which said combustion chamber is a rotary kiln.

* * * * *